Aug. 6, 1935.   C. G. SUITS   2,010,614
ELECTRIC PULSATING APPARATUS
Filed Dec. 23, 1931

Inventor:
Chauncey G. Suits,
by *Charles W. Tullar*
His Attorney.

Patented Aug. 6, 1935

2,010,614

UNITED STATES PATENT OFFICE 2,010,614

ELECTRIC PULSATING APPARATUS

Chauncey G. Suits, Schenectady, N. Y., assignor to General Electric Company, a corporation of New York Application December 23, 1931, Serial No. 582,802

8 Claims. (Cl. 177—346)

My invention relates to electric apparatus for the intermittent operation of each of a plurality of actuated devices, such for example as electric lamps, and it has for its object the provision of improved means for this purpose which is simple and entirely electrical in operation and which automatically controls the relative times of operation of the devices.

In accordance with my invention I provide a plurality of non-linear resonant pulsating circuits adapted to be energized from the same source of alternating current, each including a load device such as an electric lamp and both having approximately the same pulsation period, and I provide means cooperating with these circuits which automatically regulates the relative times of the pulsations therein.

My invention will be better understood from the following description taken in connection with the accompanying drawing, and its scope will be pointed out in the appended claims.

Figure 1:
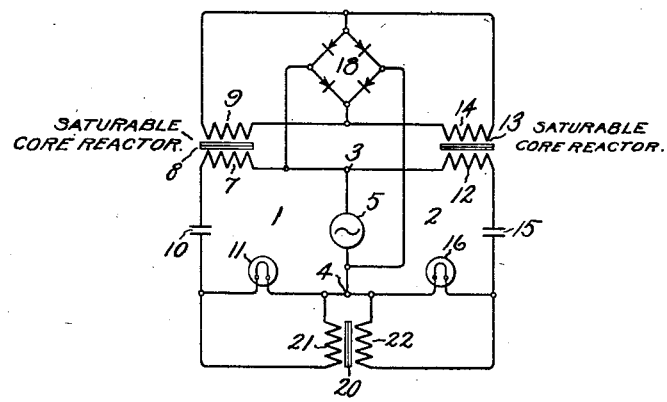
Figure 2:
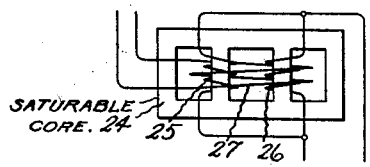
Figure 3:
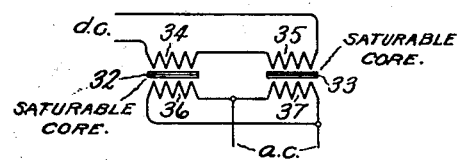

Referring to the drawing, Fig. 1 is a circuit diagram illustrating one embodiment of my invention; Figs. 2 and 3 illustrate two forms of reactor which may be used in that embodiment.

In Fig. 1 of the drawing, which is a circuit diagram illustrating an embodiment of my invention, there are two similar non-linear resonant pulsating circuits shown at 1 and 2, which by means of the terminals 3 and 4 are adapted to be connected to an alternating current source shown for example at 5. The alternating current in each of these two circuits successively increases and decreases as a result of the combination of the electric apparatus employed in each circuit although such apparatus does not include any moving parts. Circuit 1 includes the alternating current winding 7 of the saturable core reactor 8 having the saturating winding 9, the capacitor 10, and the load device 11, such for example as a tungsten filament incandescent lamp. Such a circuit has been described and claimed in my Patent No. 1,921,787, Aug. 8, 1933. Circuit 2 which as stated before is similar to circuit 1 contains the alternating current winding 12 of the saturable core reactor 13 having the saturating winding 14, the capacitor 15, and the load device 16, such for example as a tungsten filament incandescent lamp. Any suitable source of direct current may be employed for exciting the saturating windings 9 and 14. In the present case, however, I have shown these windings supplied with direct current obtained from the full wave rectifier 18 which is connected to the same source 5 of alternating current as the circuits 1 and 2.

Under suitable conditions of voltage and frequency of the alternating current source 5, which for example may be a 60 cycle 110 volt source, the alternating current in each of the two circuits 1 and 2 will successively rise and fall in a pulsating manner and with a frequency which is materially less than that of the frequency of the alternating current supply. When the current in circuit 1, for example, is small, the inductance of the reactor 8, the capacitance of capacitor 10, and the resistance of the load device 11 bear such a relation to one another that the circuit becomes resonant. The current therefore increases in value but such increase in accordance with the characteristic of saturable core reactors causes a decrease in the inductance of the reactor 8 to such an extent that the circuit is thereby detuned. Since a condition of resonance no longer exists the current reduces to its original value. As a result of this change in value of the alternating current of circuit 1, the load device or lamp 11 is successively illuminated and extinguished. Using a 60 cycle alternating current supply the pulsation frequencies obtained with this circuit may range, for example, from 10 per second to 1 in many seconds. The pulsation frequency obtinable is governed to a certain extent by the degree of saturation of the reactors. In order that the pulsations in the two circuits 1 and 2 shall be coordinated or bear some definite time relation with each other, such for example as when it is desired to have the two lamps 11 and 16 illuminated alternately, I have provided the transformer 20, preferably having a 1:1 ratio, with one winding 21 connected across one load device 11 and the other winding 22 reversely connected across the other load device 16. As so connected, when lamp 11 is illuminated thereby energizing winding 21 of the transformer, winding 22 thereof which is reversely connected to circuit 2 supplies a voltage to that circuit which prevents it from becoming resonant at the same time as circuit 1. Thus the two circuits 1 and 2 which have the same or approximately the same pulsation period are tied or coupled together by the transformer 20 so that the times of maximum current therein and consequently the times of illumination of the lamps 11 and 16 occur alternately. While I prefer to effect the coupling of the two circuits 1 and 2 by the use of the transformer 20 in order to secure a desired time relation of the pulsations in the two circuits, it will be observed that the rectifier 18, being common to the saturating windings 9 and 14 of the reactors of the two circuits, constitutes in itself a form of coupling between those circuits. Both the transformer 20 and the rectifier 18 are entirely electrical in their operation since there are no mechanically moving parts involved in their operation.

For the sake of simplicity in Fig. 1 of the drawing, I have shown the saturable core reactors 8 and 13 in a purely diagrammatic manner. Their actual construction may be as shown for example in Fig. 2 where the core 24 has four legs, the inner two of which carry the coils 25 and 26 wound in opposite directions and connected in parallel in one of the two alternating current circuits and which legs also carry the single coil 27 comprising the saturating winding. A reactor of this type is disclosed in the Alexanderson Patent 1,328,610 of Jan. 20, 1920. If desired, the reactors 8 and 13 may each be in the form of two transformers, each having its own magnetic circuit, such a form of reactor being shown in Fig. 3. These transformers respectively have cores 32 and 33, saturating windings 34 and 35 shown connected in series, and alternating current windings 36 and 37 shown connected in parallel. By reversing either the alternating current windings or the saturating windings of each pair of transformers no alternating current is induced in the direct current saturating circuit.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:

1. In combination, an alternating current supply circuit, a plurality of circuits connected therewith each containing a load device and means for causing the alternating current therein to pulsate and a transformer having its windings connected to be energized in accordance with the currents respectively in said circuits for causing the pulsations to occur alternately in the circuits.

2. In combination, an alternating current supply circuit, a plurality of circuits connected therewith each containing a load device and means for causing the alternating current therein to pulsate and a transformer having its windings connected respectively across the load devices of said circuits for causing the pulsations to occur alternately in the circuits.

3. In combination, an alternating current supply circuit, a plurality of branch circuits connected therewith each comprising a saturable core reactor, a capacitor and a lamp arranged in series whereby the illumination of said lamps pulsates at a frequency less than the frequency of said current and means interconnecting said branch circuits for controlling the relative times of occurrence of the illumination pulsations.

4. In combintion, an alternating current supply circuit, a plurality of branch circuits connected therewith each comprising a saturable core reactor, a capacitor and a lamp arranged in series whereby the illumination of said lamps pulsates at a frequency less than the frequency of said current and a transformer having its windings connected respectively across said lamps for controlling the relative times of occurrence of the illumination pulsations.

5. In combination, an alternating current supply circuit, a plurality of branch circuits connected therewith each comprising a saturable core reactor having a main winding, a capacitor and a lamp arranged in series, each reactor having a saturating winding, rectifier connected to supply rectified current from said supply to said saturating windings and a transformer having its windings connected each across one of said lamps.

6. In combination, a plurality of circuits arranged to be supplied in parallel from a source of alternating current, said circuits being non-linear resonant pulsation circuits in which the pulsation frequency is the same or approximately the same and is less than the frequency of the alternating current and means interconnecting said circuits for controlling the relative times of occurrence of the pulsations in the circuits.

7. In combination, a plurality of non-linear resonant pulsation circuits arranged to be supplied in parallel from a source of alternating current, the frequency of pulsation in said circuits being less than the alternating current frequency, and a transformer having windings connected each to be energized in response to the current in one of said circuits for controlling the relative times of occurrence of said pulsations.

8. In combination, an alternating current supply circuit, a plurality of branch circuits connected therewith each comprising a saturable core reactor, a capacitor and a load device arranged in series whereby the alternating current in each branch circuit pulsates at a frequency less than the alternating frequency and means interconnecting said branch circuits to control the relative times of occurrence of the pulsations therein.

CHAUNCEY G. SUITS.